United States Patent [19]

Sherman, II et al.

[11] Patent Number: 4,535,929
[45] Date of Patent: Aug. 20, 1985

[54] REUSABLE SHIPPING BOX WITH CAM TABS FOR RELEASE OF CLOSURE INTERLOCK

[75] Inventors: Ralph A. Sherman, II; Calvin R. Watson, both of Mesa, Ariz.

[73] Assignee: E-Z P.A.C., Inc., Mesa, Ariz.

[21] Appl. No.: 533,434

[22] Filed: Sep. 19, 1983

[51] Int. Cl.³ .............................................. B65D 5/10
[52] U.S. Cl. .................................. 229/39 R; 206/459; 206/807; 229/45 R
[58] Field of Search ....................... 206/424, 459, 807; 229/37 R, 38, 39 R, 44 R, 45 R

[56] References Cited

U.S. PATENT DOCUMENTS

| | | | |
|---|---|---|---|
| 2,011,703 | 8/1935 | Barker | 206/424 X |
| 2,190,433 | 2/1940 | Palmer | 229/37 R |
| 3,126,140 | 3/1964 | Lizan et al. | 229/39 R X |
| 3,233,818 | 2/1966 | Bixler et al. | 229/39 R |
| 3,357,630 | 12/1967 | Michelitsch | 229/45 |
| 3,451,535 | 6/1969 | Caplan | 229/39 R X |
| 4,046,311 | 9/1977 | Voytko | 229/39 R X |
| 4,163,492 | 8/1979 | Rella | 229/38 X |

FOREIGN PATENT DOCUMENTS 362971 8/1962 Switzerland .................. 229/39 R

Primary Examiner—William Price
Assistant Examiner—Gary E. Elkins
Attorney, Agent, or Firm—H. Gordon Shields

[57] ABSTRACT

Reusable box apparatus includes a single blank from which a box is formed without the need for external fasteners, such as staples, adhesive, or tape, and which blank includes a plurality of interlocking tabs and slots for fastening the box together. The completed box includes two top flaps, both of which may be pre-addressed, for alternate use in two-way shipping, and which further includes cam elements for aligning tabs with slots for the easy release of the top flaps.

18 Claims, 12 Drawing Figures

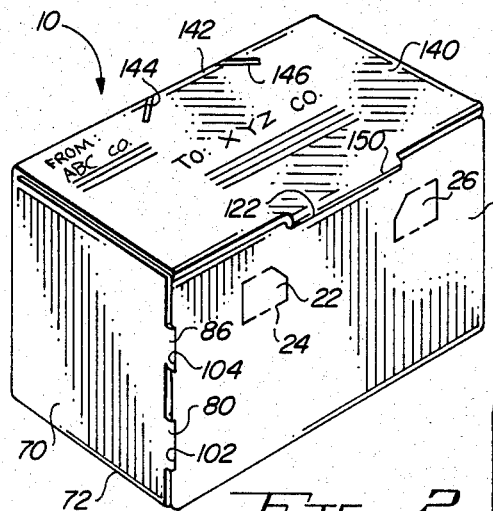
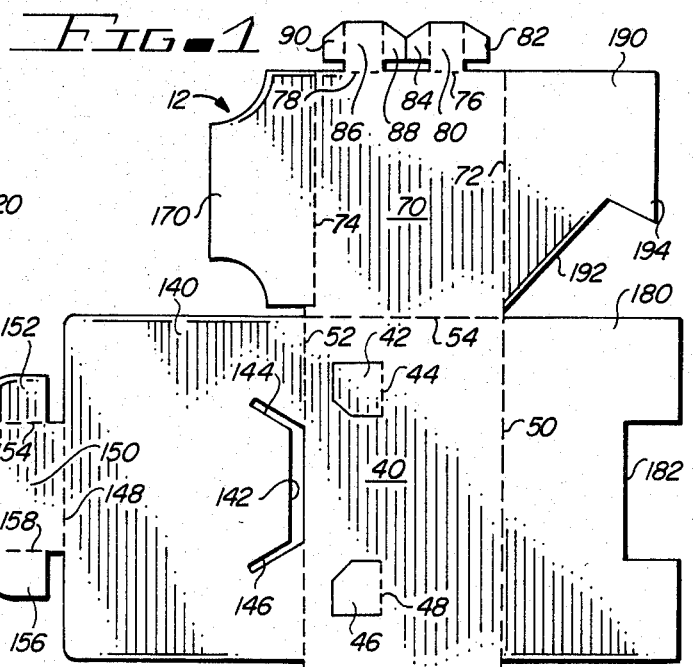
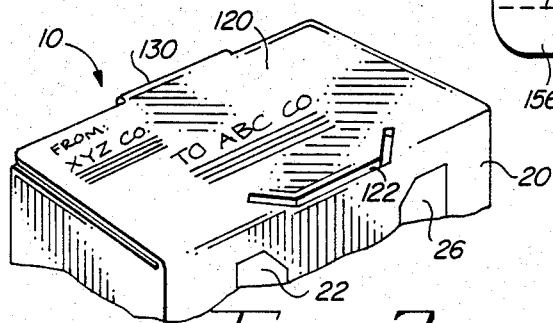
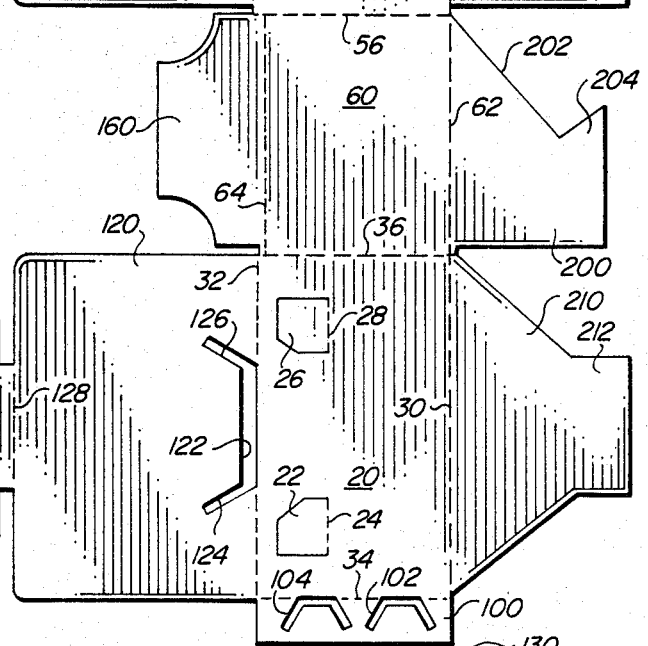
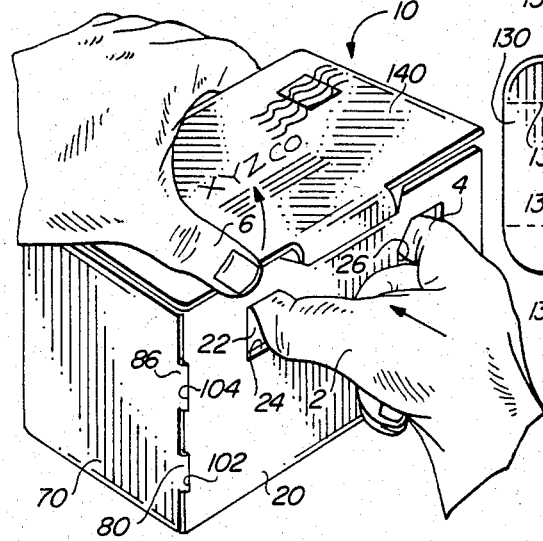
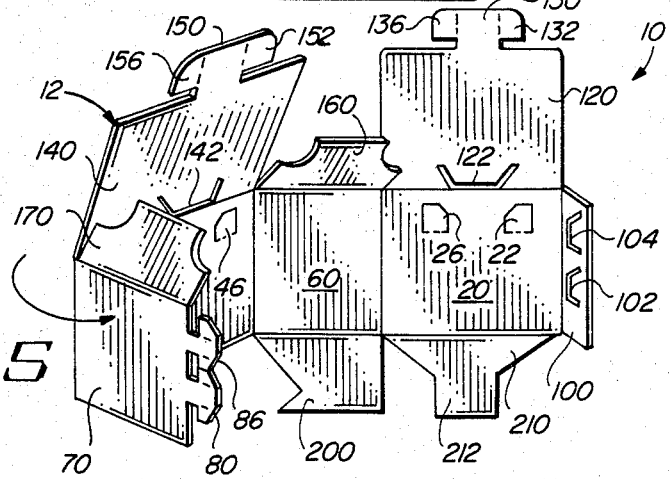

U.S. Patent Aug. 20, 1985 Sheet 2 of 2 4,535,929
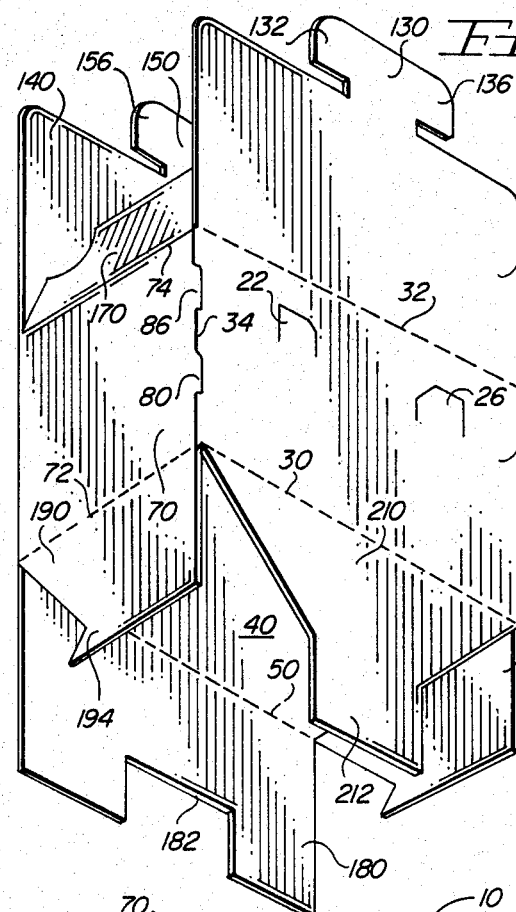

REUSABLE SHIPPING BOX WITH CAM TABS FOR RELEASE OF CLOSURE INTERLOCK

BACKGROUND OF THE INVENTION

1. Field of the Invention

This invention relates to boxes, and, more particularly, to boxes preferably made of corrugated type material and which may be reusable for two-way shipping purposes.

2. Description of the Prior Art

Containers for two-way shipping purposes have generally been made of corrugated cardboard or other types of relatively sturdy material. However, generally speaking, prior art containers have only a single top or lid flap. Such top or lid flap requires a new shipping label each time the container is shipped to a separate destination. Moreover, some appropriate type of fastener, such as staples, adhesives, or tape, is required to secure the top flap to the container for shipping purposes.

The prior art containers usually include some type of fastening element for fastening the side panels or side flaps together. Such fastening elements may include staples, adhesives, or tape or the like.

At the bottom of containers, particularly containers made of corrugated or fluted type material, interlocking flaps have been used for a number of years. Such interconnecting and interlocking flaps do not require tape or other fastening elements. However, such is not the case with the securing of the sides together. As indicated above, tape, staples, or adhesives, or other elements are generally required to secure the sides together.

Recently, a container has been developed with dual top flaps for two-way shipment. A co-inventor hereof is also co-inventor of the dual top flap apparatus, and such is employed herein. An advantage of the use of dual flaps is that the flaps may be pre-printed so that one flap indicates the destination for one direction and the other flap indicates the destination for shipment in the opposite or return direction. The pre-printed flaps are alternately used and thus the requirement of separate shipping labels is obviated.

SUMMARY OF THE INVENTION

The invention described and claimed herein comprises a box made of a single blank of material. The blank includes a plurality of sides, flaps, tabs, and slots which are interlocking and which cooperate to define, when assembled, a box or container that is unitary in that no extra elements, such as staples, adhesive, or tape, are required to secure the box together since the interlocking tabs and angled slots cooperate to lock the various sides and flaps of the box together. The slots and tabs include cam elements which allow tabs to be aligned with the slots for the easy release of locking wing tabs to allow the top flaps to be unlocked. The unlocking of the top flaps allows the box apparatus to be opened for loading and unloading, or opening and closing, purposes.

Among the objects of the present invention are the following:

To provide new and useful box apparatus;

To provide new and useful box apparatus made from a single blank;

To provide new and useful box apparatus having self-locking tabs for securing the sides of the box together;

To provide new and useful dual top flap box apparatus;

To provide new and useful box apparatus having dual interlocking tops for two-way shipment purposes; and To provide new and useful box apparatus including cam tabs for aligning locking wing tabs with slots for the release of flap elements.

BRIEF DESCRIPTION OF THE DRAWING

FIG. 1 is a plan view of the blank from which box apparatus of the present invention is formed.

FIG. 2 is a perspective view of assembled box apparatus of the present invention.

FIG. 3 is a perspective view of the apparatus of FIG. 2 with top flaps folded differently.

FIG. 4 is a perspective view illustrating the unlocking of top flaps of the apparatus of the present invention.

FIG. 5 is a perspective view of the blank of FIG. 1 illustrating the folding of the blank to assemble the box apparatus illustrated in FIGS. 2, 3, and 4.

FIG. 6 is a perspective view of the blank of FIG. 1, illustrating an assembly step for the box apparatus of the present invention.

FIG. 7 is a perspective view illustrating another assembly step for the fabrication of the box apparatus of the present invention.

FIG. 8 is a perspective view illustrating another assembly step sequentially following the step shown in FIG. 7.

FIG. 9 is a perspective view illustrating another assembly step sequentially following the step illustrated in FIG. 8.

FIG. 10 is a perspective view showing another assembly step for the box apparatus of the present invention.

FIG. 11 is a perspective view showing another assembly step for the box apparatus of the present invention, sequentially following the step illustrated in FIG. 10.

FIG. 12 is a perspective view showing another assembly step for the box apparatus of the present invention, sequentially following the step illustrated in FIG. 11.

DESCRIPTION OF THE PREFERRED EMBODIMENT

Box apparatus 10 of the present invention is made from a blank 12. The blank 12 is shown in FIG. 1. FIG. 1 comprises a plan view of the blank 12 from which the box apparatus 10 is made.

FIG. 2 comprises a perspective view of the assembled box apparatus 10. FIG. 3 is a perspective view of a portion of the box apparatus 10, showing an alternate folding of a portion of the box, namely the top portion or top flap. The box apparatus 10 includes two top flaps, namely a top flap 120 and a top flap 140, which may alternately be used. With the top flaps 120 and 140 pre-addressed, the box apparatus 10 may be used for two-way shipment of goods. That is, one top flap may be pre-addressed for shipment from a first location to a second location, and the second top flap may be pre-addressed for shipment from the second location back to the first location.

FIG. 4 is a perspective view illustrating the unlocking of the top flap 140, shown in FIG. 1, to allow the box apparatus 10 to be opened.

FIGS. 5-12 are views illustrating sequentially the assembly of the box apparatus 10. FIGS. 5, 6, 7, 8, and 9 illustrate the basic assembly of the box apparatus 10 from the blank 12, including the assembly of the sides and the bottom flaps. FIGS. 10, 11, and 12 illustrate the folding and closing of the top flaps of the box apparatus 10. For the following discussion, reference will be made primarily to FIGS. 1 and 5-12. General discussion will of course, include FIGS. 2, 3, and 4, in addition to FIGS. 1 and 5-12.

As best shown in FIG. 1, the blank 12 includes a plurality of panels, tabs, and slots, together with fold or score lines which comprise lines on which the various panels which make up the blank are folded relative to each other and which, when assembled, all together define a container 10. The container or box 10 is, as illustrated, rectangular in configuration. However, the same principles as discussed herein may be applied to a square (cube) box or a generally rectangular box having different ratios between the various sides, etc. For purposes of illustration and discussion herein, the box 10 defines a generally rectangular container, and the various sides or panels accordingly reflect the general rectangular configuration.

The material out of which the blank 12 is formed is preferably corrugated or fluted material to provide strength and durability and, to a certain extent, resiliency or a cushion effect for the various sides of the container or box. Thus, the blank 12 may be made of corrugated paper, if desired. However, a plastic or polymer material, such as a polypropylene or polyethylene material, and corrugated or fluted, is preferable. A plastic corrugated or fluted material has several advantages over corrugated cardboard. For example, plastic has advantages in durability and in imperviousness to liquids such as water. Moreover, some plastics have a characteristic which is particularly advantageous in the apparatus of the present invention. That characteristic is a "memory" such that when a tab is bent, for locking purposes, the tab will return to its original, aligned or planar state or configuration when the bending force is released. Thus, the deformation or bend along a fold line does not result in a permanent fold. Rather, the material springs back or returns to its original configuration. The return allows or provides for the locking features which will be discussed below.

The blank 12 is preferably die cut to the configuration shown in FIG. 1. As cut, the blank 12 includes a generally rectangular front panel 20. The front panel 20 includes a pair of tabs 22 and 26, and the tabs 22 and 26 are generally aligned with each other and are virtually mirror images of each other. The tabs each include a fold line. The tab 22 includes a fold line 24, and the tab 26 includes a fold line 28. The fold lines 22 and 28 are aligned with each other. The tabs 22 and 26 are of a generally rectangular configuration with a diagonal cut across the top or upper inner corner of each tab. The term "inner" refers to the tab portions that face each other.

The fold lines 24 and 26 are on the bottoms of the tabs, remote from the diagonally cut edges. The fold lines 24 and 28 allow the tabs 22 and 26 to be bent or moved inwardly to the interior of the container 10 to cooperate with locking tabs. The tabs 22 and 26 define cam elements to cam portions of the locking tabs into alignment for unlocking or releasing purposes. This will be discussed in detail below.

The front panel 20 also includes four outer fold lines which comprise the four edges of the panel 20. The fold lines include a fold line 30, which is a bottom fold line, a fold line 32, which is a top fold line, and a pair of side fold lines 34 and 36. The fold lines 30, 32, 34, and 36 may be scored or in some other way, such as by pressure, may be specifically delineated in the blank 12.

The blank 12 also includes a back panel 40. When the box apparatus 10 is assembled, the primary front panel 20 and the back panel 40 are aligned generally parallel to each other. This is best shown in FIG. 6.

The back panel 40 is substantially identical to the front panel 20. It includes a pair of cam tabs 42 and 46, and the tabs 42 and 46 include a pair of fold lines 44 and 48, respectively. The fold lines 44 and 48 are aligned with each other. The tabs 42 also include diagonally cut lower edges, which face each other, all as discussed above in conjunction with the description of the cam tabs 22 and 26 of front panel 20.

Defining the outer periphery of the panel 40 are four fold or score lines, including a bottom line 50, a top line 52, and a pair of side lines 54 and 56.

Between the panels 20 and 40 is a rectangular end panel 60. The outer sides or edges of the end panel 60 are defined by the fold or score lines 36 and 56 of the panels 20 and 40, respectively. The bottom and top edges of the end panel 40 are defined by a pair of fold or score lines 62 and 64, respectively.

When the box apparatus 10 is assembled, there is a second end panel 70 which is disposed generally parallel to the end panel 60. The end panel 70 is, like the end panel 60, generally rectangular in configuration. It is defined at one end by the fold or score line 54 of the back panel 40, a bottom fold or score line 72, a top or upper fold or score line 74, and by a pair of locking tabs 80 and 86, which extend outwardly from the end panel 70. A pair of score or fold lines 76 and 78, respectively, define the juncture of the locking tabs and the end panel 70.

The tab 80 is a lower locking tab and the tab 86 is an upper locking tab. The locking tabs 80 and 86 both include a pair of outer wings which are folded at an angle to the base or center portion of the tabs for insertion into locking slots, as will be discussed below. The tab 86 includes a pair of wing elements 82 and 84, and the tab 86 includes a pair of wing elements 88 and 90. Fold or score lines delineate the wing portions from the base portions of the tabs.

The locking tabs 80 and 86 cooperate with a relatively short end flap 100 which extends outwardly from the primary front panel 20. The fold or score line 34 defines the boundary or juncture between the end flap 100 and the panel 20.

The end flap 100 includes a pair of slots 102 and 104. The slots 102 and 104 are spaced apart from each other. They both include center base portions which are aligned with each other and which are disposed along the fold line 34. The slots 102 and 104 each include a pair of outwardly diverging angular portions such that the slots 102 and 104 each look like a generally rectangular horseshoe with outwardly extending legs, or like a block "U" with the arms or legs of the "U" extending angularly outwardly or away from each other. For locking purposes, the wings of the locking tabs 80 and 86 are bent or are folded so that the three portions of the tabs are appropriately aligned with the three portions of the respective locking slots. After alignment, the tabs are inserted into and through the slots.

After insertion, the wing elements of the locking tabs return or unbend, due to the "memory" characteristic discussed above, to their aligned or planar configuration. This locks the panels 70 and 100 together. The wings accordingly prevent the withdrawal of the tabs from the slots except when they are specifically bent for alignment with the slots for either insertion or withdrawal, as desired.

For assembly of the box (or container or carton) 10 from the blank 12, the end flap 100 is bent until it is generally perpendicular to the panel 20, and thus generally parallel to and against the end panel 70. The bend, of course, occurs along the fold or score line 34. Similarly, the tabs 80 and 86 are also folded or bent substantially perpendicularly to the end panel 70 along their respective fold or score lines 76 and 78, so that they are disposed generally parallel to and against the panel 20. This may be visualized with reference to FIG. 5, and may also be understood from reference to FIGS. 2, 4, and 6–12.

A pair of top flaps 120 and 140 extend outwardly from the panels 20 and 40, respectively. The top flap or panel 120 extends away from the panel 20 from the fold or score line 32. The flap or panel 120 includes a locking slot 122, which is of generally the same configuration, only larger, as the locking slots 102 and 104 in the end flap 100. The locking slot 122 includes a pair of angled portions 124 and 126, which extend generally away from the center or base portion of the slot 122 remote from each other at opposite ends of the base portion. The slot 122, with its angled portions 124 and 126, thus looks like an open horseshoe or a block "U" with the arms or legs extending outwardly from the bottom portion. The bottom of the slot 122, which is the base or central portion, is aligned with the fold line 32.

Extending outwardly from the flap or panel 120, and remote from the locking slot 122, is a locking tab 130. The locking tab 130 is connected to the flap or panel 120 at a fold or score line 128. The tab 130 includes a pair of wing elements 132 and 136. The wing elements 132 and 136 extend outwardly from the locking tab 130 from a pair of fold lines 134 and 138, respectively.

The top flap or panel 140 is substantially identical to the flap or panel 120. The flap or panel 140 includes a locking slot 142 with a pair of outwardly extending angled portions 144 and 146. The base or center portion of the slot 142 is aligned with the fold or score line 52. The fold line 52 defines the upper portion of the panel 40 and separates the panel 40 from the panel or flap 140.

Extending outwardly from the panel 140 is a locking tab 150. The locking tab 150 includes a pair of wing elements 152 and 156. The wing elements 152 and 156 extend outwardly from the center or base portion of the locking tab 150. The wings 152 and 156 are separated from the center or base portion of the tab 150 by a pair of fold or score lines 154 and 158, respectively. A fold or score line 148, which is generally parallel to the fold or score line 152, defines the separation or boundary line between the locking tab 150 and the panel 140.

Extending upwardly from the end panel 60, and separated therefrom by the fold or score line 64, is a top or upper end wing 160. A second and generally parallel top or upper end wing 170 extends upwardly from the end panel 70. The fold or score line 74 defines the boundary between the end panel 70 and the end wing 170.

A bottom main panel 180 extends downwardly or outwardly from the panel 40. The fold or score line 50 defines the boundary between the main bottom panel 180 and the panel 40. The bottom panel 180 includes a notch 182. The notch 182 is generally of a rectangular configuration.

A bottom end panel 190 extends outwardly from the end panel 70. The fold or score line 72 defines the boundary between the end panel 70 and the bottom end panel 190.

The bottom end panel 190 includes an angled edge 192 which extends at an angle from the juncture of the fold or score lines 50 and 54 of the panel 40 and the fold or score line 72 of the panel 70. The edge 192 terminates at a fixed tab portion 194. The purpose of the fixed tab portion 194 will be discussed below.

A second bottom end panel 200 extends outwardly from the end panel 60. The fold lines 62 defines the boundary between the end panel 60 and the bottom end panel 200.

The bottom end panel includes an angled edge 202 which extends outwardly from the juncture of the fold lines 50 and 56 of the panel 40 and the fold or score line 62 of the end panel 60. The angled edge 202 terminates at a fixed tab portion 204.

The tab portions 204 and 194 of the end panels 200 and 190, respectively, extend generally towards each other, as best shown in FIG. 1, and are used in conjunction with the securing together of the bottom of the container apparatus 10. This will be discussed in detail below.

A bottom locking panel 210 is secured to the front panel 20 at its fold or score line 30. The bottom locking panel 210 includes a fixed locking tab 212 which extends outwardly from the panel 210, remote from the fold line 30. The edges of the locking panel 210 extend generally inwardly or towards each other from the juncture of the fold lines 30 and 34 and the fold lines 30 and 36, at opposite sides or ends of the panel 20. The inwardly extending edges terminate at the fixed locking tab 212. The locking tab 212 is generally rectangular in configuration, and it cooperates with the notch 182 of the main bottom panel 180 to secure the four bottom panels together. The four bottom panels include the main bottom panel 180, the two bottom end panels 190 and 200, and the locking panel 210. This will be discussed in detail below.

For assembling the box 10 from the blank 12, the blank 12 is folded along the primary fold or score lines which delineate or define the various panels, as discussed above. The first step in assembling the box 10 is to put the general rectangular sides or side panels together, thus defining the basic rectangular configuration for the box or container 10. This first step is best shown in FIG. 5. Sequentially, the steps of assembling the box 10 from the blank 12 is shown in FIGS. 5, 6, 7, 8, and 9. For the following discussion concerning the assembly of the box apparatus 10, reference will primarily be made to FIGS. 1 and 5–9.

As indicated above, the first step in assembling the box apparatus from the blank 12 is to assemble the four sides, including the front panel 20, the back panel 40, and the end panels 60 and 70. This is accomplished by folding the blank 12 along the fold lines 36, 56, and 54, and also along the fold line 34 of the locking end flap 100 and the fold lines 76 and 78 for the locking tabs 80 and 86. With the blank 12 thus folded, as shown in FIG. 5, the basic rectangular configuration is obtained.

After the basic rectangular configuration is obtained, the locking tabs 80 and 86 are locked in place in the slots 102 and 104, respectively, of the end flap 100. The engaging of the locking tabs 80 and 86 with the slots 102 and 104, respectively, is accomplished by bending the wing elements of the locking tabs to fit into the appropriate portions of the locking slots 102 and 104. The wings 82 and 84 of the locking tab 80 are bent along their fold lines until they will extend through the portions of the slot 102. Similarly, the wings 88 and 90 of the locking tab 80 are bent or folded until they will extend through the slot 104 of the end flap 100.

When the locking tabs 80 and 86 fully extend through the locking slots 102 and 104, the wings of the locking tabs return or unbend to their normally flat, or open configuration, as shown in FIGS. 1 and 5. The wings are thus no longer aligned with the slots 102 and 104 and accordingly the locking tabs 80 and 88 are locked in the end flap 100. The basic rectangular configuration of the box apparatus 10 is accomplished and locked in place without the need for exterior locking elements, such as tape, adhesive, or staples, or the like. The basic configuration is shown in FIG. 6.

After the locking tabs 80 and 86 are appropriately locked to the end tab 100, in the assembly of the box apparatus 10, the four bottom panels may be secured together by interlocking the four panels. This is accomplished by first folding the main bottom panel 180 along the fold line 50 of the panel 40. The main bottom panel 180 is thus folded to bring it substantially perpendicular to the rear panel 40. The bottom end panels 190 and 200 are then folded along their respective fold lines 72 and 62, respectively. The angled edges 192 and 202 of the panels 190 and 200, respectively, are disposed on top of the bottom panel 180, with the fixed tabs 184 and 204 overlying the notch 182. This is sequentially shown in FIGS. 7 and 8.

After the end panels 190 and 200 are folded, as shown in FIG. 8, the bottom locking panel 210 is then folded along its fold line 30. The bottom locking panel 210, including its fixed locking tab 212, is initially folded the ninety degrees necessary to cause the panel 210 and its tab 212 to overlie the other three bottom panels. However, the folding movement is continued. The bottom locking panel 210 is then pivoted or moved past the ninety degree angular orientation, with respect to the front panel 20. This movement may actually be considered as a continuous movement from the original open position, as shown in FIG. 8 of the locking panel 210. That is, the folding or pivoting movement of the locking panel 210 is preferably a continuous pivoting or folded movement which is greater than ninety degrees. The movement of the panel 210, after it contacts the other three bottom panels, results in, or causes, an inwardly pivoting movement of the other three panels, also, from their original perpendicular or folded orientation as shown in FIG. 8.

The inward movement of the locking panel 210 continues until its fixed locking tab 212 extends through the notch 182 of the main bottom panel 180. When the tab 212 extends into the notch 182, the bottom of the box 10 is secured together. During the inward movement, the fixed tab portions 194 and 204 of the bottom end panels 190 and 200, respectively, also extend into the notch 182. This effectively locks the end panels 190 and 200 to the main bottom panel 180. The movement of the fixed locking tab 212 into the notch 182 then also locks the panel 210 to the panel 180.

As may be best understood from FIGS. 8 and 9, the movement of the locking tab 212 on top of the end panels 190 and 200 causes the fixed tabs 194 and 204 to extend into the notch 182, along with the tab 212. The locking tab 212 is thus disposed between the fixed tabs 194 and 204 and the bottom panel 180. In this manner, with the inter-relationship of all four bottom panels, the bottom of the container box apparatus 10 is securely locked together. The bottom locking panel 210, and its fixed locking tab 212, must first be withdrawn from the interlocking relationship before the box may be taken apart, if such is ever desired.

With the four bottom panels locked into position, as shown in FIG. 9, the box or container apparatus 10 is generally assembled. The arrangement of the top panels allows the top panels or flaps to each be pre-addressed with a predetermined addressee on one flap and a return address on the other flap. Accordingly, the box may be used for two-way transportation or shipment, with the folding order of the top panels determining the particular addressee.

As shown in FIGS. 10, 11, and 12, the top flaps or panels 120 and 140 also lock in place so that the entire container 10 is appropriately sealed without the need for external sealing elements.

For securing the top of the container apparatus 10, the top end flaps or wing flaps 160 and 170 are first folded downwardly along their fold lines 64 and 74, respectively.

Assuming that the top flap or panel 140 is to be folded last, and thus is to be on top, the top flap or panel 120 is first folded along its fold or score line 32. The locking tab 130 is folded along the fold or score line 128 and it is thus disposed generally parallel to, and against the inside of the panel 40.

With the panel 120 folded downwardly, and defining an inner top flap for the container or box apparatus 10, the locking slot 122, the base portion of which is along the fold line 32, is ready to receive the locking tab 150 of the top flap 140. The top flap 140 is folded along its fold or score line 52, and the locking tab 150 is folded along its fold or score line 148. For locking purposes, the wing elements 152 and 156 of the locking tab 50 are folded along their respective fold lines 154 and 158 so as to be aligned with the angular slot portions 124 and 126, respectively, of the locking slot 122. After the locking tab 150 is extended into the locking slot 122, and downwardly therethrough, the memory of the material out of which the blank 12 is made allows the wings 152 and 156 to return or unbend to their original, generally flat position, shown in FIGS. 10 and 11. In their flat or planar orientation, they are disposed along the front panel 20, and away from any alignment with the angular portions 124 and 126 of the locking slot 122. The locking tab 150 thus locks in place the top flap or panel 140. The box apparatus 110 is now completely assembled, ready for shipment, assuming that desired material had been inserted into the container 10 prior to the folding of the top flaps 120 and 140.

The folded and completely assembled box or container apparatus 10 is shown in FIGS. 2, 3, and 4. With the flap or panel 140 showing, or defining the top or outer flap of the container 10, the container 10 is being sent by or from ABC Company to XYZ Company. This is shown best in FIGS. 2 and 4. In FIG. 3, the flap 120 is shown as the outer flap for return shipment from XYZ Company to ABC Company. The difference, of course, between the box apparatus 10 of FIGS. 2 and 4 and the box apparatus 10 of FIG. 3 is that the top panels or flaps 120 and 140 are reversed.

For a reversal of the top flaps, such as shown in FIG. 3, the assembly of the apparatus 10 is substantially identical to that discussed above in conjunction with FIGS. 10, 11, and 12, except that the flap 140 is folded inwardly first, and then the flap 120 is folded last. The same assembling or folding procedures or steps for the top flaps are used because the top flaps are substantially identical to the other.

For opening the box apparatus 10, the general procedure illustrated in FIG. 4 is followed. It will be noted, as discussed above in conjunction with the blank 12 of FIG. 1, that the panels 20 and 40 each include a pair of cam tabs. The front panel 20 includes a pair of cam tabs 22 and 26, and the panel 40 includes a pair of cam tabs 42 and 46. The tabs 22, 26, and 42, 46 define pivoting cam tabs. When the tabs 22, 26 or 42, 46 are pivoted inwardly along their fold or score lines, as illustrated in FIG. 4, the tabs contact the wing elements of the locking tabs for the purpose of bending or folding the wings to align the wings with the angled portions of the locking slots. When the wings are appropriately aligned with the angled portions of the locking slots, a top flap may be moved upwardly as shown in FIG. 4 to open the container apparatus 10.

As discussed above, and as shown in the drawing, a corner or edge of the tabs 22 and 26 is cut off. The angle of the cut-off corner is substantially the same as the angle of the angled portions of the locking slots, namely the angled portions 124 and 126 of the locking slot 122, and the angled portions 144 and 146 of the locking slot 142. As best shown in FIG. 1, the cut-off corner of the cam tabs is substantially parallel to the angled portions of the locking slots. Thus, when the cam tabs are bent inwardly, the wing elements of the locking tabs are cammed into a substantially exact alignment with the angled portions of the locking slot in order to release the wing elements and the entirety of the locking tabs from the locking slots. Obviously, the exact positioning of the cam tabs, and their dimensions, is correlated with the locking tabs and their wing elements to provide the desired alignment and camming movement of the wing elements of the locking tabs for unlocking purposes.

In FIG. 4, a thumb 2 and a forefinger 4 of a user's hand are shown applying pressure or force on the cam tabs 22 and 26 in the front panel 20. The cam tab 22 is shown pivoting inwardly and downwardly on its fold or score line 24, and the tab 26 is similarly moving inwardly and downwardly as it pivots on its fold or score line 28 (see FIG. 1). The cam tabs 22 and 26 in their camming positions, as shown in FIG. 4, make appropriate contact with the wing elements 152 and 156, respectively, of the locking tab 150 of the top flap 140. The movement of the wings 152 and 156 as cammed by the tabs 22 and 26 causes the wings 152 and 156 to align themselves appropriately with the angled portions 124 and 126 of the locking slot 122. At such time as the wings 152 and 156 are thus aligned with the angled portions 124 and 126 of the slot 122, the top panel 140 may pivot upwardly. This is accomplished by the movement of the thumb 6 of the user's other hand, together with the movement of the other hand, as shown in FIG. 4.

To lift the top flap 120, as shown in FIG. 3, the same thumb and forefinger pressure is used on the tabs 42 and 46, as shown in FIG. 3. This results in the appropriate movement of the wings 132 and 136 to align them with the angled portions 144 and 146 of the locking slot 142. When the alignment is accomplished, the top 120 may be lifted in a manner substantially identical to that discussed in conjunction with FIG. 4, above.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Carton apparatus, comprising, in combination:
   first panel means defining one side of the carton apparatus;
   first end panel means secured to the first panel means and defining a second side of the carton apparatus;
   second panel means defining a third side of the carton apparatus and secured to the first end panel means remote from the first panel means;
   second end panel means secured to the second panel means remote from the first end panel means and defining a fourth side of the carton apparatus;
   means for securing together the first panel means and the second end panel means;
   bottom panel means defining the bottom of the carton apparatus;
   first top flap means secured to the first panel means, including first locking slot means disposed adjacent to the first panel means;
   second top flap means secured to the second panel means;
   locking tab means secured to the second top flap means remote from the second panel means apd adapted to extend through the first locking slot means to lock the second top flap means to the first top flap means; and
   cam means for camming the locking tab means into alignment with the first locking slot means for unlocking the second top flap means from the first top flap means.

2. The apparatus of claim 1 in which the first locking slot means includes a base portion and an angled portion.

3. The apparatus of claim 2 in which the locking tab means includes a first portion and a wing portion disposed in the same plane, and the wing portion is adapted to be bent at an angle to the first portion for insertion of the first portion and the wing into the respective base portion and the angled portion of the first locking slot means, and the wing means unbends after insertion through the locking slot means to lock the second top flap means to the first top flap means.

4. The apparatus of claim 3 in which the cam means includes a tab secured to the first panel and disposed adjacent to the locking slot means and to the first top flap means and adapted to pivot to align the wing portion of the locking tab means with the angled portion of the locking slot means for removing the locking tab means from the locking slot means.

5. The apparatus of claim 4 in which the cam means in the camming position further includes an edge disposed generally parallel to the angled portion of the locking slot means.

6. Carton apparatus made from a simple blank, comprising, in combination:
first top flap means, including a first locking slot means extending through the first top flap means;
first locking tab means secured to the first top flap means;
first panel means secured to the first top flap means remote from the first locking tab means and adjacent to the first locking slot means;
first end panel means secured to the first panel means;
second top flap means, including a locking slot means extending through the second top flap means and adapted to receive the first locking tab means when the first top flap means defines an outer flap for the carton apparatus;
second locking tab means secured to the second top flap means and adapted to extend through the first locking slot means when the second top flap means defines an outer flap for the carton apparatus;
second panel means secured to the second top flap means remote from the second locking tab means and adjacent to the second locking slot means and to the first end panel means;
second end panel means secured to the second panel means remote from the first end panel means;
means for securing the second end panel means to the first panel means;
bottom panel means secured to the first and second panel means and to the first and second end panel means and inter-engaging with one another to define an interlocked bottom for the carton apparatus; and
cam means secured to the first and second panel means for selectively biasing the locking tab means to the locking slot means for releasing the locking tab means to unlock whichever top flap means defines the outer flap for the carton apparatus.

7. The apparatus of claim 6 in which the first and second locking slot means each include a base portion and an angled portion, and the first and second locking tab means each include a first portion adapted to extend into the base portions of the locking slot means and wing portions adapted to be folded at an angle to the first portions for extending into and through the angled portions of the locking slot means and to return to their unfolded state after extending through the angled portions to lock the first and second top flaps together.

8. The apparatus of claim 6 in which the cam means includes
a first cam means secured to the first panel means for biasing the wing portions of the second locking tab means to the angled portions of the first locking slot means when the second top flap means defines the outer flap, and
a second cam means secured to the second panel means for biasing the wing portions of the first locking tab means to the angled portions of the second locking slot means when the first top flap means defines the outer flap.

9. The apparatus of claim 8 in which the first and second cam means each include a tab disposed adjacent to a wing portion and movable to bias their respective wing portions to align the wing portions with the angled portions of the locking slots to unlock the first and second top flaps.

10. The apparatus of claim 9 in which the tabs of the first and second cam means in the camming position each include an edge disposed generally parallel to the respective angled portions of the locking slot means.

11. The apparatus of claim 8 in which the means for securing the second end flap means to the first panel means includes an end flap having a locking slot and a locking tab adapted to extend into the locking slot.

12. In a container, locking apparatus for locking folded portions, comprising, in combination:
first flap means, including a first flap and a first panel secured to the first flap;
locking slot means extending through the first flap, including
a base portion, and
a first angled portion extending outwardly from the base portion;
second flap means;
locking tab means secured to the second flap means, including
a first portion adapted to extend into and through the base portion of the locking slot means, and
a first wing portion secured to the first portion and adapted to fold into alignment with the first angled portion of the locking slot means and to extend therethrough and then to unfold out of alignment with the first angled portion to lock the second flap means to the first flap means; and
cam means secured to the first panel for bending the wing portions into alignment with the angled portion of the locking slot means for removing the locking tab means from the locking slot means.

13. The apparatus of claim 12 in which the cam means includes a cam tab pivotally secured to the first panel and disposed adjacent to the locking slot means.

14. The apparatus of claim 13 in which the cam tab in the camming position includes an edge substantially parallel to the first angled portion of the locking slot means.

15. The apparatus of claim 12 in which the locking slot means includes a second angled portion extending outwardly from the base portion, remote from the first angled portion, and the locking tab means includes a second wing portion secured to the base portion and adapted to fold into alignment with the second angled portion and to extend through the second angled portion of the locking slot means and then to unfold out of alignment with the second angled portion.

16. The apparatus of claim 15 which the first flap includes a first flap and a first panel secured to the first flap, and the locking slot means extends through the first flap adjacent to the first panel.

17. The apparatus of claim 16 in which the first panel of the first flap means includes cam means for bending the first and second wing portions into alignment with the first and second angled portions of the locking slot means for removal of the locking tab means from the locking slot means.

18. The apparatus of claim 17 in which the cam means includes a first cam disposed adjacent to the first wing portion and a second cam disposed adjacent to the second wing portion.

* * * * *